April 23, 1963　　　L. P. ENGLUND　　　3,086,456
APPARATUS FOR BALING
Original Filed Sept. 1, 1960　　　　　　3 Sheets-Sheet 1

INVENTOR.
LAWRENCE P. ENGLUND
BY
ATTORNEYS

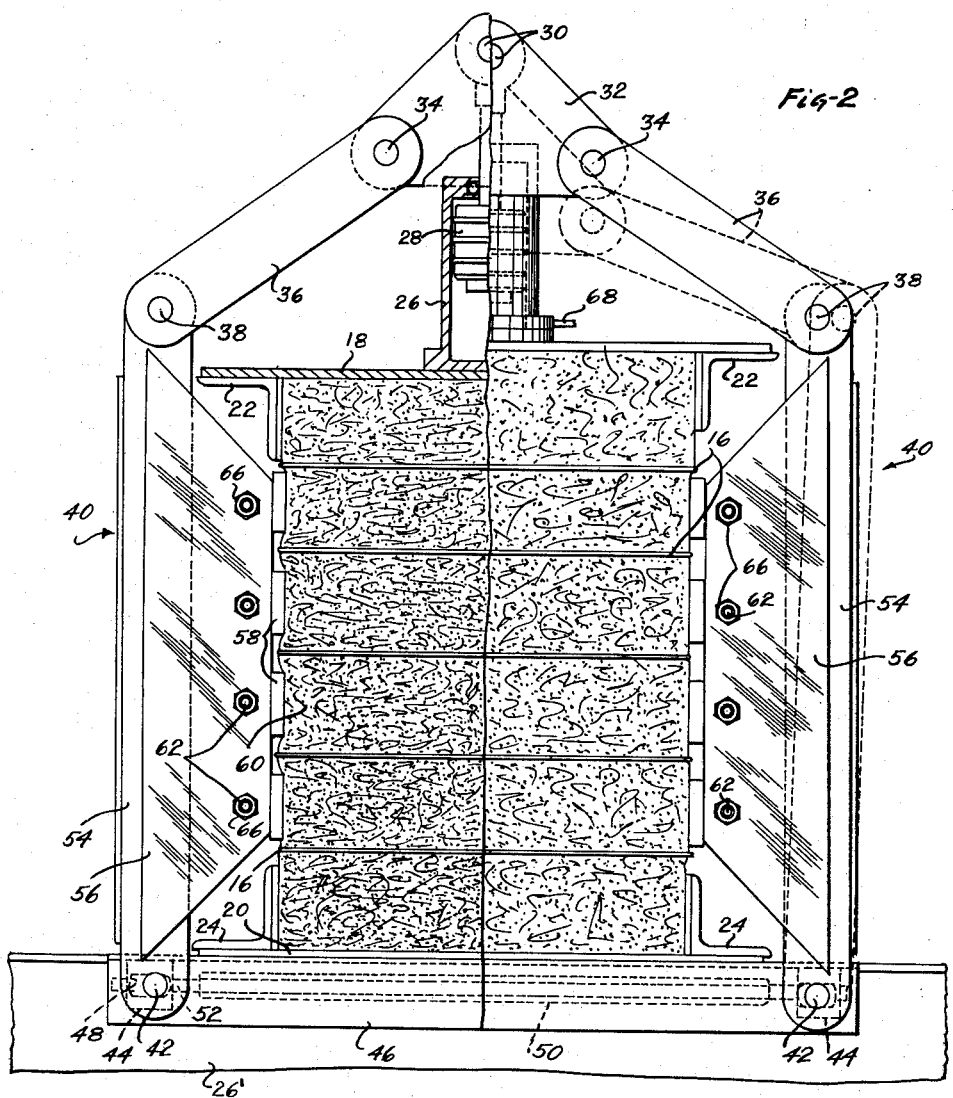

April 23, 1963   L. P. ENGLUND   3,086,456
APPARATUS FOR BALING
Original Filed Sept. 1, 1960   3 Sheets-Sheet 3
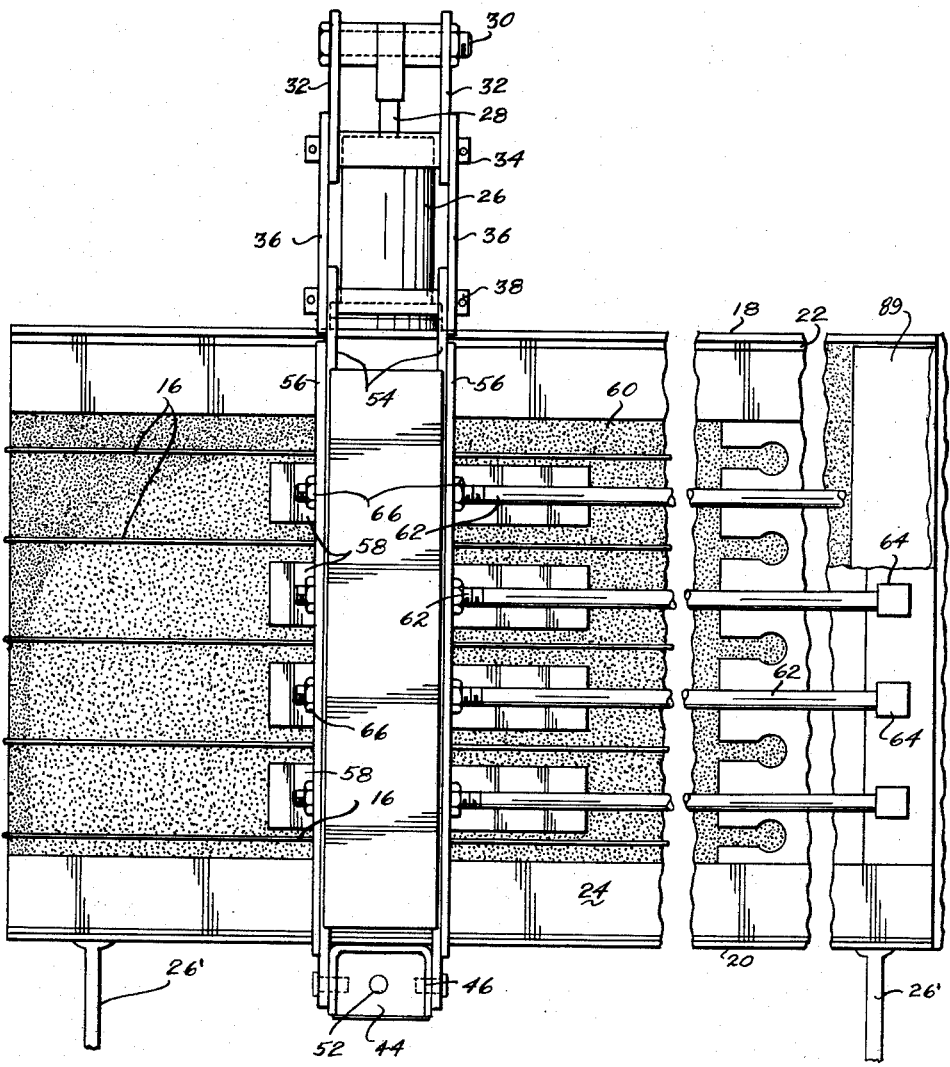
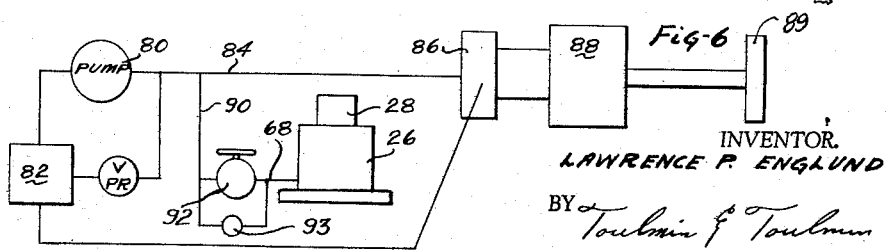
INVENTOR.
LAWRENCE P. ENGLUND
BY
ATTORNEYS

United States Patent Office 3,086,456
Patented Apr. 23, 1963

3,086,456
APPARATUS FOR BALING
Lawrence P. Englund, Huron County, Ohio, assignor to The American Baler Company, Bellevue, Ohio, a corporation of Ohio
Original application Sept. 1, 1960, Ser. No. 53,531, now Patent No. 3,024,719, dated Mar. 13, 1962. Divided and this application Oct. 25, 1961, Ser. No. 147,528
6 Claims. (Cl. 100—192)

This invention relates to balers and is particularly concerned with a baler for baling shredded waste paper and the like. In particular the present invention is concerned with an improved choke arrangement associated with the discharge end of the baling chamber by which improved baling results can be had.

This application is a division of my copending application Ser. No. 53,531, now Patent 3,024,719.

Baling machines are known, not only for baling agricultural products but also for baling waste paper and other industrial refuse such as metal scrap. What has been found to occur many times is that the bales formed in the baling machines are not compressed to a proper degree or are not uniformly compressed, thus producing improperly shaped bales or bales in which the density is so low that they tend to disintegrate. This is particularly objectionable in connection with the baling of waste paper, especially where the waste paper is finely shredded because it is necessary to be able to move the bales about to stack them for storage and it is usually necessary to ship them long distances to a paper mill where the paper will be used.

This difficulty arises chiefly on account of variations in the drag placed on the bale as it is pushed through the baling chamber. This drag is created by a choke structure which has an arrangement for restricting the movement of the bale through the discharge end of the baling chamber. Any simple mechanical choke structure is ineffective because it does not take into account possible variations in a cross-sectional area of a bale being pushed through the baling chamber.

With the foregoing in mind, one of the primary objectives of the present invention is the provision of the improved choke structure for a bailing mechanism which is particularly effective in connection with the baling of finely shredded paper scrap and which is operative to insure the production of dense uniform bales.

Still another object of this invention is the provision of an automatically variable choke structure for a baler which will accommodate itself to variations in the cross-section of the bale being made.

Still another object of this invention is the provision of an improved choke structure for a baling machine which can easily be adjusted to adapt it to various conditions.

The foregoing objects as well as still other objects and advantages of the present invention will become more apparent upon reference to the following specification taken in connection with the accompanying drawings, in which:

FIGURE 2 is a transverse sectional view indicated by line 2—2 on FIGURE 1 showing the choke construction more in detail;

FIGURE 3 is a side elevation view showing the choke end of the baling machine;

FIGURE 6 is a diagrammatic representation of a typical hydraulic actuating circuit for a baling machine according to the present invention.

Figures 1, 4, 5:
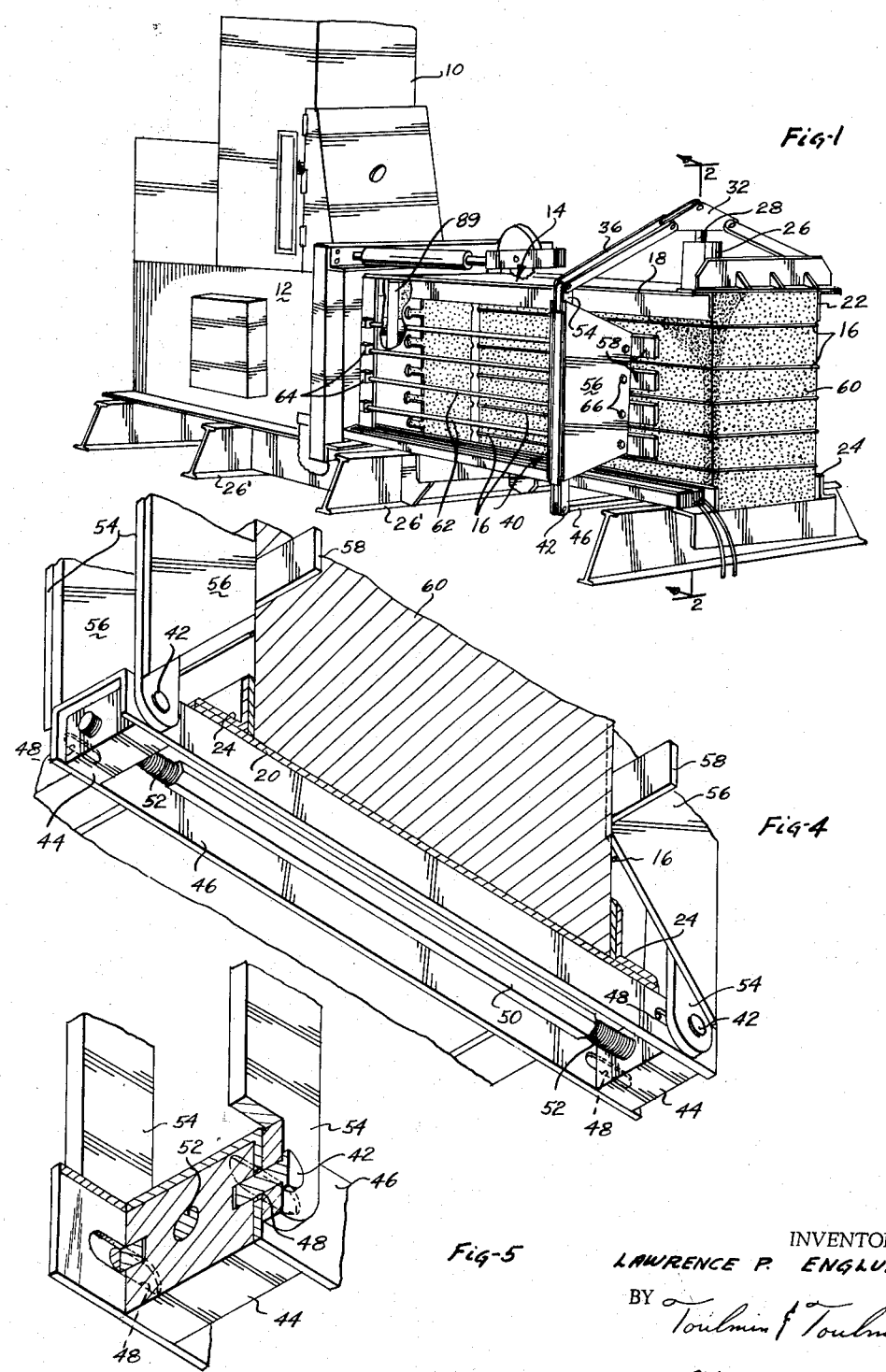
FIGURE 1 is a perspective view showing a baling machine having a choke according to the invention incorporated therein.
FIGURE 4 is a perspective view of the lower end of the choke structure looking up from beneath the baling machine showing an adjustment associated with the choke structure.
FIGURE 5 is a fragmentary sectional view showing a portion of the adjusting mechanism.

Referring to the drawings somewhat more in detail, the baling machine illustrated in FIGURE 1 comprises a hopper 10 through which shredded paper or the like is delivered into a chamber 12 through which the material is pushed by a compacting head into an elongated baling chamber generally indicated at 14. The baling chamber is open on the sides so that banding wires 16 can be placed around the bales as they are moving through the baling chamber.

The baling chamber comprises a top plate 18 and a bottom plate 20 which are cantilevered from the chamber 12 so that at their outer ends where the bale is discharged from the baling chamber, the said top and bottom plates can be moved toward and away from each other.

The present invention is particularly concerned with the construction of the device by means of which the top and bottom plates of the baling chamber are urged toward each other thereby to restrict the movement of the bales from the baling chamber to cause the desired degree of baling pressure to be built up on the material being baled. A device of this nature forms an adjustable choke that can be availed of for insuring that the bales being made are of the proper uniform density, drag and length.

Reference to FIGURES 2 and 3 taken in connection with FIGURE 1 will reveal that top plate 18 has attached to the side edges thereof angles 22, whereas bottom plate 20 has attached to the side edges thereof the angles 24. The bottom plate 20 is stationarily supported as, for example, on the transverse sill means 26′, whereas the top plate is free to move upwardly and downwardly under the influence of the choke mechanism to be described.

The choke mechanism, according to this invention, comprises a linkage arranged about the bailing chamber adjacent the discharge end and including a cylinder 26 resting on top plate 18 and having therein a ram 28 that projects from the upper end of the cylinder.

Ram 28 is connected by pin 30 with a triangular connector member 32 that also carries pins 34 that are pivotally attached to the upper ends of downwardly and outwardly extending links 36. At their lower ends links 36 are pivoted by pins 38 to the vertically extending side frames 40. These side frames extend downwardly to below bottom plate 20 and are connected by pins 42 with blocks 44.

Blocks 44 are slidably disposed inside a downwardly opening channel member 46 extending laterally beyond bottom plate 20. The sides of channel member 46 are slotted as at 48 for receiving pins 42 so that the blocks 44 can be adjusted in the channel longitudinally thereof.

Extending through the channel between blocks 44 is an adjusting rod 50 having its opposite ends oppositely threaded as at 52, and threadedly engaging the blocks 44 so that the rotation of rod 50 will move the blocks 44 either toward each other or away from each other.

The side frame members 40 each consist of spaced vertical bars 54 that carry the pivot pins 38 and 42, and to which bars are attached plates 56 that extend inwardly from the bars toward the baling chamber. At their inner edges plates 56 carry the rails 58 that slidably engage the sides of a bale 60 passing through the baling chamber. Plates 56 are also availed of for receiving the ends of tension rods 62 that are anchored at the center part of the baling machine, as indicated at 64 in FIGURE 1 and which are also attached to the side frame members 40 as by the nuts 66. These rods carry the axial thrust composed on the choke mechanism by movement of the bale through the baling chamber.

Reference to FIGURE 2 will show that the linkage of the choke mechanism is so arranged that when ram 28 is thrust upwardly in piston 26 by a supply of pressure fluid thereto via conduit 68, the top plate 18 of the baling chamber is pushed downwardly toward lower plate 20, while simultaneously the side frame members 40 are pushed inwardly toward each other thereby restricting the bale in both vertical and lateral directions. Suitable adjustment of adjusting rod 50 will insure that the bales will be substantially uniform in width from top to bottom.

The control of the pressure supplied to the cylinder 26 is accomplished by an arrangement of the nature illustrated in FIGURE 6. In this view a pump 80 draws fluid from a reservoir 82 and supplies it at pump pressure to a conduit 84 leading to a valve 86 that is connected with the compacting head or baling plunger actuating motor 88 that reciprocates baling plunger 89 in the baling chamber.

A branch conduit 90 leads through an adjustable pressure regulating valve 92 to conduit 68 and in this manner a regulated supply of pressure is delivered to cylinder 26 to provide for the desired degree of thrust on ram 28.

The pressure regulating valve 92 is bypassed by an auxiliary valve 93 which will relieve the pressure in cylinder 26 if it exceeds a predetermined amount. This auxiliary valve could be combined with the regulating valve 92 so that the pressure in cylinder 26 could be maintained with predetermined close limits. The relief of pressure from this cylinder can become necessary when an extremely dense portion is pressed through the baling chamber and the provision of the auxiliary valve will prevent the load on the baling plunger from exceeding the predetermined maximum.

By utilizing the choke arrangement of the present invention, a high degree of density of the bales can be had so that the bales do not tend to deteriorate after being made and, instead, are of uniform shape and size and density and, furthermore, are regularly shaped so that they can easily be handled and do not roll when set up on end.

The provision of the choke permits material to be baled which is shredded to an extremely high degree of fineness which is normally difficult to bale, but which is of advantage because the paper is in an ideal condition for processing in a paper plant to make new paper.

It will be understood that this invention is susceptible to modification in order to adapt it to different usages and conditions; and, accordingly, it is desired to comprehend such modifications within this invention as may fall within the scope of the appended claims.

I claim:

1. In a baling machine; an elongated baling chamber, a baling plunger reciprocable in said chamber in one end thereof to compact material to be baled therein and to push the material toward and out the other end of the baling chamber said baling chamber at said other end comprising a fixed bottom wall, a vertically movable top wall, and laterally movable side wall means, a vertically acting piston-cylinder means having one part mounted on the top wall and having another part, links connecting said other part with said side wall means at the top thereof, and means carried on the botom of said bottom wall extending laterally of the baling chamber and adjustable in length and interconnecting said side wall means at the bottom, whereby energization of said piston-cylinder means will cause said side wall means to be urged toward each other and will also cause said top wall to be urged toward said bottom wall.

2. In a baling machine; an elongated baling chamber, a baling plunger reciprocable in said chamber in one end thereof to compact material to be baled therein and to push the material toward and out the other end of the baling chamber, said baling chamber at said other end comprising a fixed bottom wall, a vertically movable top wall, and laterally movable side wall means, means extending laterally beneath said bottom wall and carried thereby adjustably interconnecting said side wall means at the bottom, a cylinder mounted on the top wall, a piston in the cylinder extending out the top thereof, links pivoted to the piston and extending downwardly and outwardly to the tops of said side wall means, and means for supplying pressure fluid to said cylinder to thrust the piston upwardly therein thereby to urge the top wall toward the bottom wall and to urge said side wall means toward each other.

3. In a baling machine; a baling chamber having a discharge end with top and bottom walls, at least the top wall at the said discharge end of the baler being supported for movement toward said bottom wall, side walls for the baling chamber movable toward each other, an expansible fluid motor having one part mounted on the top wall at said discharge end and having a second part movable upwardly relative to said one part, said side walls comprising bars pivoted to the bottom wall and extendin upwardly along opposite sides of said baling chamber, and links pivoted to and angling upwardly and inwardly from the upper ends of said bars and pivoted to said part of said motor.

4. In a baling machine; a baling chamber having a discharge end with top and bottom walls, at least the top wall at the said discharge end of the baler being supported for movement toward said bottom wall, side wall means for the baling chamber movable toward each other, a cylinder mounted on said top wall, a ram in said cylinder projecting upwardly therefrom, a connector plate pivotally connected to the outer end of said ram, said side wall means comprising bars extending upwardly along opposite sides of said baling chamber, links pivotally connected to the upper ends of said bars and extending inwardly and upwardly therefrom and pivotally connected to said connector plate, blocks beneath the bottom wall to which the lower ends of said bars are pivoted, and means for moving said blocks toward and away from each other, the last mentioned said means comprising a rod having its opposite ends oppositely threaded and said rod threadedly engaging said blocks at its opposite ends.

5. In a baling machine; a baling chamber having a discharge end with top and bottom walls, at least the top wall at the said discharge end of the baler being supported for movement toward said bottom wall, side wall means for the baling chamber movable toward each other, a cylinder mounted on said top wall, a ram in said cylinder projecting upwardly therefrom, a connector plate pivotally connected to the outer end of said ram, said side wall means comprising bars extending upwardly along opposite sides of said baling chamber, links pivotally connected to the upper ends of said bars and extending inwardly and upwardly therefrom and pivotally connected to said connector plate, blocks beneath the bottom wall to which the lower ends of said bars are pivoted, a rod having its opposite ends oppositely threaded and said rod threadedly engaging said blocks at its opposite ends, there being a downwardly opening channel member extending transversely beneath said bottom wall and connected thereto, said blocks being slidably mounted in said channel and said rod extending along within said channel.

6. In a baling machine; a baling chamber, top and bottom walls for said baling chamber, said top wall at its outer end being movable toward the outer end of said bottom wall, said outer ends of said top and bottom walls forming the discharge end of said baling chamber, said top and bottom walls being rigidly interconnected in their inner ends which inner ends forms the entrance end of the baling chamber, side walls for the baling chamber substantially shorter than the baling chamber and located at the discharge end thereof, said side walls comprising horizontally extending vertically spaced plates and vertical bar means outside of said plates relative to the baling chamber and connected to said plates, means adjustably pivotally supporting the lower ends of said bar means in the region of said bottom wall, a fluid motor mounted on the top wall having a vertically movable ram extending out of the top thereof, links pivotally connecting the upper end of said ram with the upper ends of said bar means, said links extending downwardly and outwardly from said ram to said bar means so that energization of said motor will urge said top wall at its outer end toward said bottom wall while simultaneously urging said side walls toward each other, means for supplying a regulated pressure to said motor, and tension rod means fixed to said bar means at one end and extending longitudinally of said baling chamber and stationarily anchored in the region of the said inner ends of said top and bottom walls.

References Cited in the file of this patent
UNITED STATES PATENTS

| | | |
|---|---|---|
| 802,410 | Sanders | Oct. 24, 1905 |
| 1,065,648 | Wygant | June 24, 1913 |
| 1,076,288 | Jackson | Oct. 21, 1913 |
| 1,631,881 | Murray | June 7, 1927 |
| 2,576,784 | Dodds et al. | Nov. 27, 1951 |
| 2,791,172 | Russell | May 7, 1957 |
| 2,823,603 | Collins | Feb. 18, 1958 |